(12) United States Patent
Lee (10) Patent No.: US 7,125,156 B2
(45) Date of Patent: Oct. 24, 2006

(54) ULTRA-THIN BACKLIGHT DISPLAY PANEL

(75) Inventor: Hsin-Nung Lee, Taipei (TW)

(73) Assignee: Sinology Enterprise Co., Ltd., Taipei County (TW)

( * ) Notice: Subject to any disclaimer, the term of this patent is extended or adjusted under 35 U.S.C. 154(b) by 156 days.

(21) Appl. No.: 10/710,439

(22) Filed: Jul. 12, 2004

(65) Prior Publication Data

US 2005/0174805 A1    Aug. 11, 2005

(30) Foreign Application Priority Data

Feb. 10, 2004  (TW) .............................. 93201885 U (51) Int. Cl.
*F21V 7/04*  (2006.01)
*F21V 33/00*  (2006.01)

(52) U.S. Cl. .................... 362/632; 362/614; 362/618

(58) Field of Classification Search ................ 362/602, 362/604, 605, 606, 607, 610, 614, 618, 623, 362/624, 632, 633, 634; 349/58
See application file for complete search history.

(56) References Cited

U.S. PATENT DOCUMENTS

| | | | | |
|---|---|---|---|---|
| 4,985,809 A | * | 1/1991 | Matsui et al. | 362/624 |
| 5,207,493 A | * | 5/1993 | Murase et al. | 362/623 |
| 5,654,779 A | * | 8/1997 | Nakayama et al. | 362/613 |
| 6,857,212 B1 | * | 2/2005 | Velez | 362/632 |

* cited by examiner

*Primary Examiner*—Y. My Quach-Lee
(74) *Attorney, Agent, or Firm*—Winston Hsu (57) ABSTRACT

An ultra-thin backlight display panel has an upper housing, a lower housing, and a backlight module. Each of the two housings has a cold cathode fluorescent lamp (CCFL) for generating light. The backlight module has a light guide plate, a transparent film, and a reflection film. The light guide plate has four sides, where two of the four sides are connected with the upper housing and the lower housing, and the other two sides are respectively covered with a reflective material. The transparent film is positioned on a first plane of the light guide plate, and the reflection film is positioned on a second plane of the light guide plate to reflect light from the two cold cathode fluorescent lamps.

5 Claims, 9 Drawing Sheets

ULTRA-THIN BACKLIGHT DISPLAY PANEL

BACKGROUND OF INVENTION

1. Field of the Invention

The invention is related to a display panel, and more particularly to an ultra-thin backlight display panel.

2. Description of the Prior Art

Basically, traditional advertisement boards use fluorescent tubes as light sources to enhance their surface illumination. However, the fluorescent tubes have high-energy consumption and short lifetime. Besides, because the prior art advertisement boards must be large enough to install the fluorescent tubes, the thickness and the volume of the prior art advertisement boards could not be decreased easily. Therefore, the prior art advertisement boards have heavy and thick appearances and are not beautiful and fashionable at all.

SUMMARY OF INVENTION

It is therefore a primary objective of this invention to provide an ultra-thin backlight display panel that has lower-energy consumption, longer lifetime, and a good-looking appearance.

The ultra-thin backlight display panel has an upper housing, a lower housing, and a backlight module. The upper housing has a first cold cathode fluorescent lamp (CCFL) for generating light and a first lampshade for collecting light generated by the first CCFL. The lower housing has a second CCFL for generating light and a second lampshade for collecting light generated by the second CCFL. The backlight module has a light guide plate, a transparent film, and a reflection film. The light guide plate has four sides. Two of the four sides are connected with the upper housing and the lower housing, and the other two sides are respectively covered with a reflective material. The transparent film is positioned on a first plane of the light guide plate and the reflection film is positioned on a second plane of the light guide plate to reflect light from the first CCFL and the second CCFL. The reflective materials covering the two sides of the light guide plate reflect light from the light guide plate back.

It is an advantage that the present invention ultra-thin backlight display panel uses cold cathode fluorescent lamps (CCFLs) as light sources and a light guide plate to uniformize surface illumination of the ultra-thin backlight display panel. Therefore, the ultra-thin backlight display panel has lower-energy consumption, longer lifetime, and a good-looking appearance.

These and other objectives of the present invention will no doubt become obvious to those of ordinary skill in the art after reading the following detailed description of the preferred embodiment, which is illustrated in the various figures and drawings.

DETAILED DESCRIPTION

Figure 1:
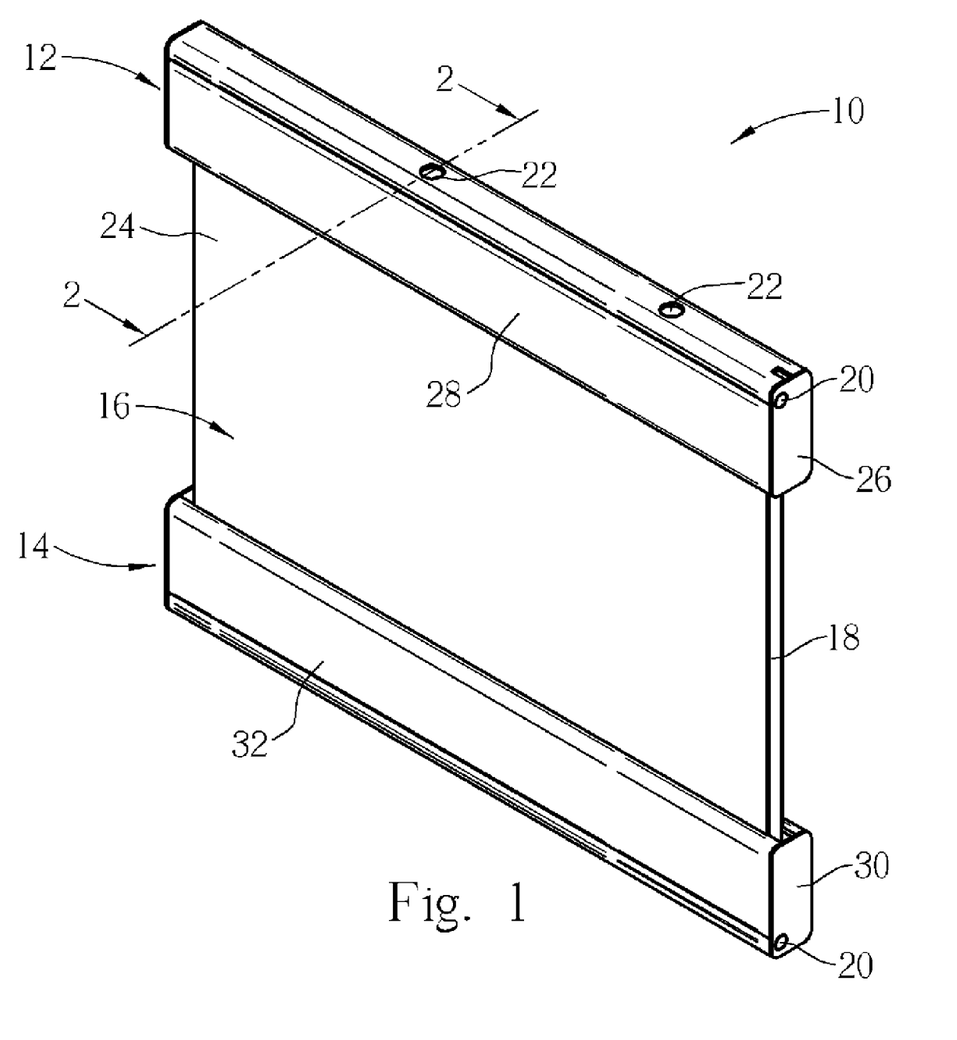
FIG. 1 is a diagram of an ultra-thin backlight display panel according to the present invention.
Figure 2:
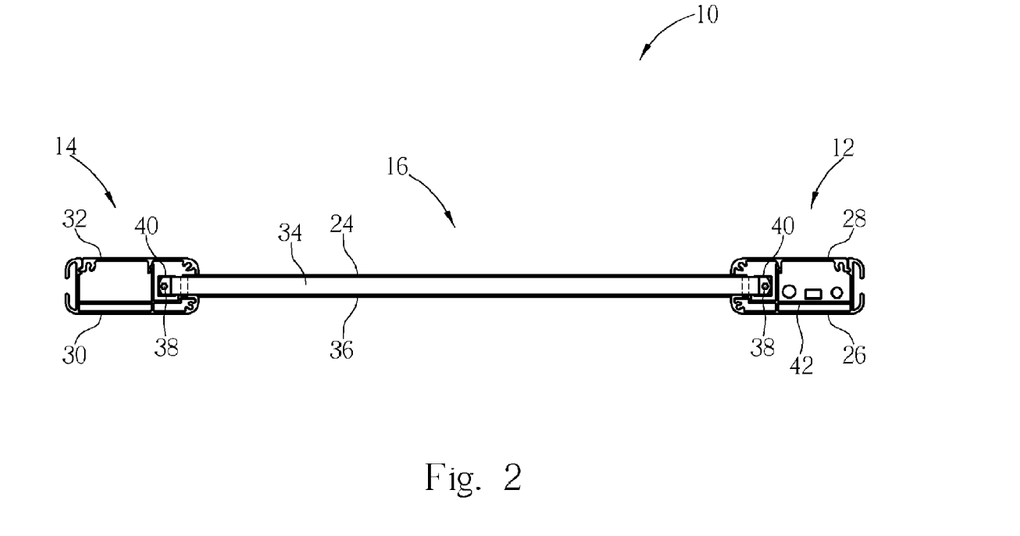
FIG. 2 is a cross-sectional diagram along a line 2—2 of the ultra-thin backlight display panel shown in FIG. 1.

Please refer to FIGS. 1–2, FIG. 1 is a diagram of an ultra-thin backlight display panel 10 according to the present invention, and FIG. 2 is a cross-sectional diagram along a line 2—2 of the ultra-thin backlight display panel 10 shown in FIG. 1. The ultra-thin backlight display panel 10 has an upper housing 12, a lower housing 14, and a backlight module 16. A circuit board for controlling the operations of the ultra-thin backlight display panel 10 is installed in the upper housing 12 and connects to a power supply. The backlight module 16 has a rectangular shape and its thickness is about one centimeter. The upper side and the lower side of the backlight module 16 are respectively connected to the upper housing 12 and the lower housing 14. Compared to the prior art advertisement boards, the present invention ultra-thin backlight display panel 10 is thinner. The upper housing 12 and the lower housing 14 respectively has a cold cathode fluorescent lamp (CCFL) 38 to generate light and a lampshade 40 to collect the light generated by the CCFL 38 so that most of the light generated by the CCFL 38 is guided to the backlight module 16. In the embodiment, the two CCFLs 38 are efficient type CCFLs, and compared to normal fluorescent tubes, they can provide about 80 percent savings in electric energy. Moreover, there is another advantage to using the CCFLs as light sources. The lifetime of the CCFLs can be as long as 50,000 hours, i.e. about six years.

A light-uniformity technique of liquid crystal displays (LCDs) to make illumination of the surface of the panel uniform is adapted to design the backlight module 16. The backlight module 16 has a light guide plate 34, a transparent film 24, and a reflection film 36. The light guide plate 34 has four sides, where two of the four sides are connected with the upper housing 12 and the lower housing 14, and the other two sides are respectively covered with a reflective material 18. The transparent film 24 is positioned on a plane of the light guide plate 14 and could be a positive film, a negative film, a plastic film, a filmstrip, a bright film and so on. The transparent film 24 is not only transparent but also capable of diffusing light to make its surface illumination uniform. The transparent film 24 can be used to record an image, picture, text and so on to provide users with specific information. The reflection film 36 is positioned on another plane of the light guide plate 34 and opposite to the transparent film 24 to reflect light generated by the CCFLs 38 so as to enhance the surface illumination of the transparent film 24 so that the image, picture, or text on the transparent film 24 can be clearer. A uniform illumination pattern is formed on the surface of the reflection film 36 to make light uniformly illuminate the transparent film 24 so that the surface illumination of transparent film 24 can be uniform. As shown in FIG. 1, the right side and the left side of the backlight module 16 are covered with the reflective materials 18 without a frame. The reflective materials 18 reflect light from the light guide plate 34 back so that the light generated by the two CCFLs 38 will not be lost from the right side and the left side of the light guide plate 34. The surface illumination of the transparent film 24, thus, is increased.

Figure 3:
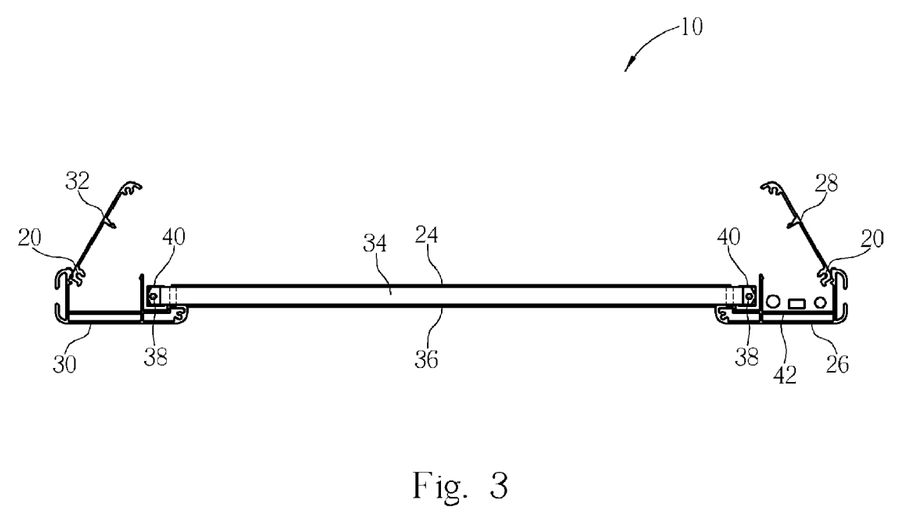
FIG. 3 is a cross-sectional diagram showing how to replace a transparent film of the ultra-thin backlight display panel shown in FIG. 2.
Figure 4:
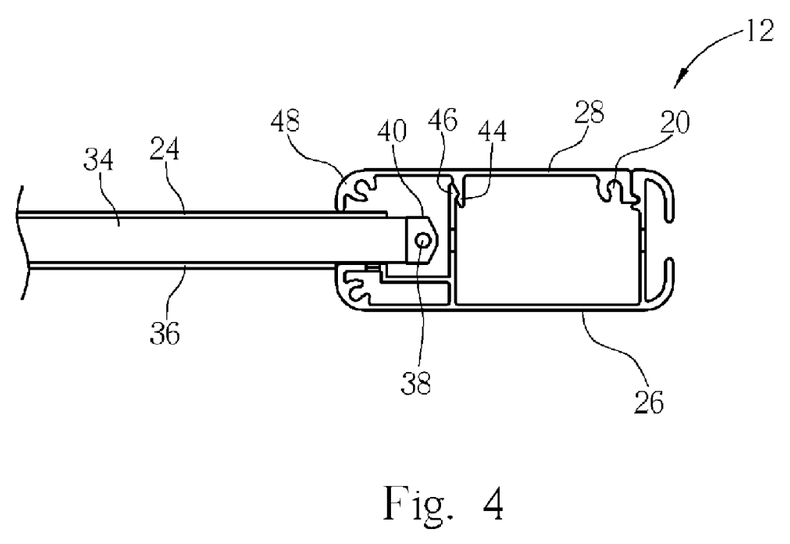
FIG. 4 is a cross-sectional diagram of an upper housing shown in FIG. 2.
Figure 5:
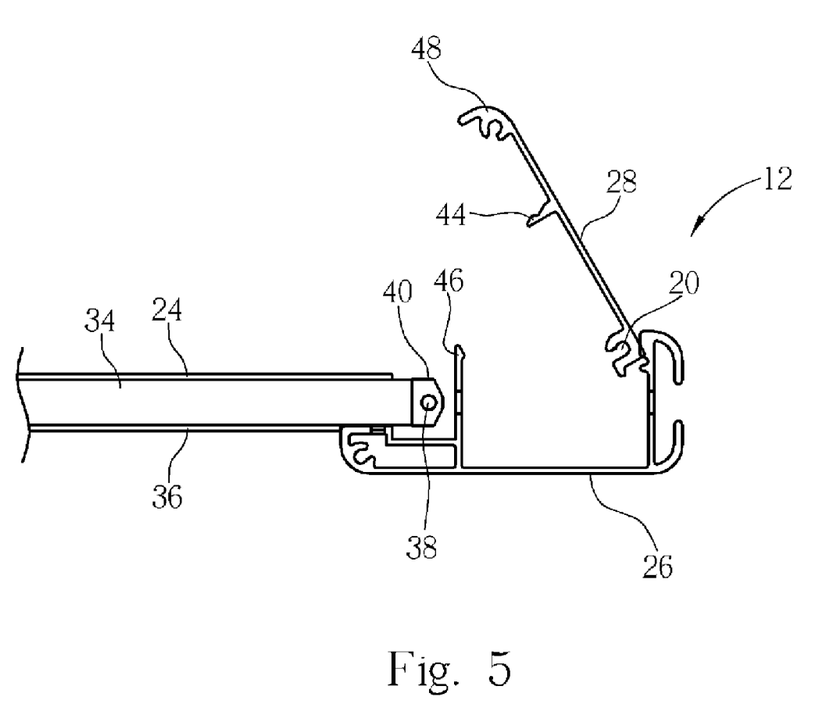
FIG. 5 is a cross-sectional diagram of the upper housing shown in FIG. 2 while the transparent film is replaced.

Please refer to FIGS. 3–5, FIG. 3 is a cross-sectional diagram showing how to replace the transparent film 24 of the ultra-thin backlight display panel 10 shown in FIG. 2, FIG. 4 is a cross-sectional diagram of the upper housing 12 shown in FIG. 2, and FIG. 5 is a cross-sectional diagram of the upper housing 12 shown in FIG. 2 while the transparent film 24 is replaced. The upper housing 12 has an upper cover 28 and an upper base 26. The upper cover 28 is installed on the upper base 26 in a rotatable manner and capable of rotating along a pivot 20. Similarly, the lower housing 14 has a lower cover 32 and a lower base 30. The lower cover 32 is installed on the lower base 30 in a rotatable manner and capable of rotating along another pivot 20. While the upper cover 28 and the lower cover 32 are respectively covered with the upper base 26 and the lower base 30, the transparent film 24 is clipped and fixed by the upper cover 28 and the lower cover 32. The upper cover 28 has a first latch 44 and the upper base 26 has a second latch 46. When the upper cover 28 is covered with the upper base 26, the first latch 44 and the second latch 46 are buckled together, which makes a rim 48 of the upper cover 28 clip the transparent film 24 on the surface of the light guide plate 34. The structure of the lower cover 32 is similar with the upper cover 28 and also has a latch capable of buckling the lower cover 32 and the lower base 30 together.

Figure 6:
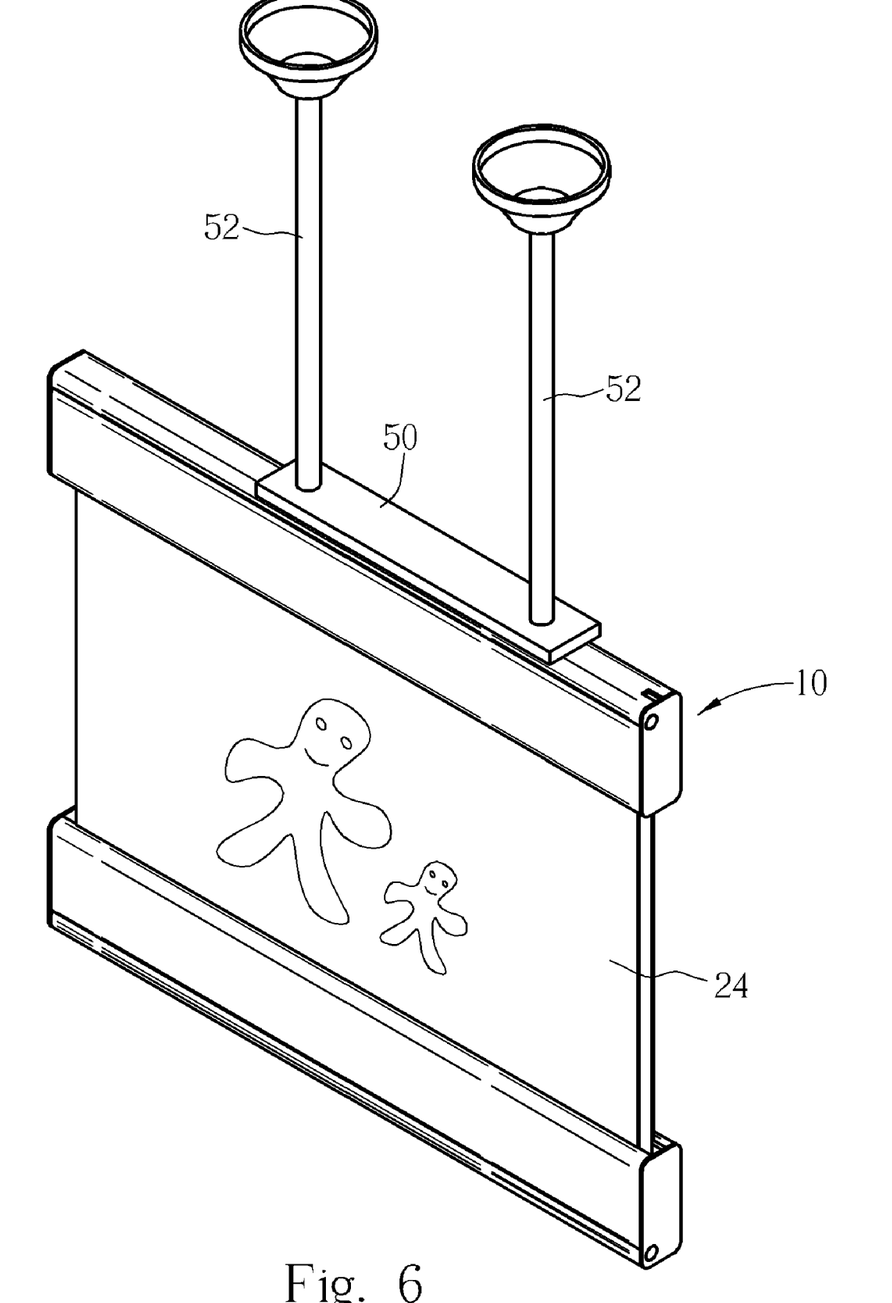
FIGS. 6–9 show how to use the ultra-thin backlight display panel shown in FIG. 1.
Figure 7:
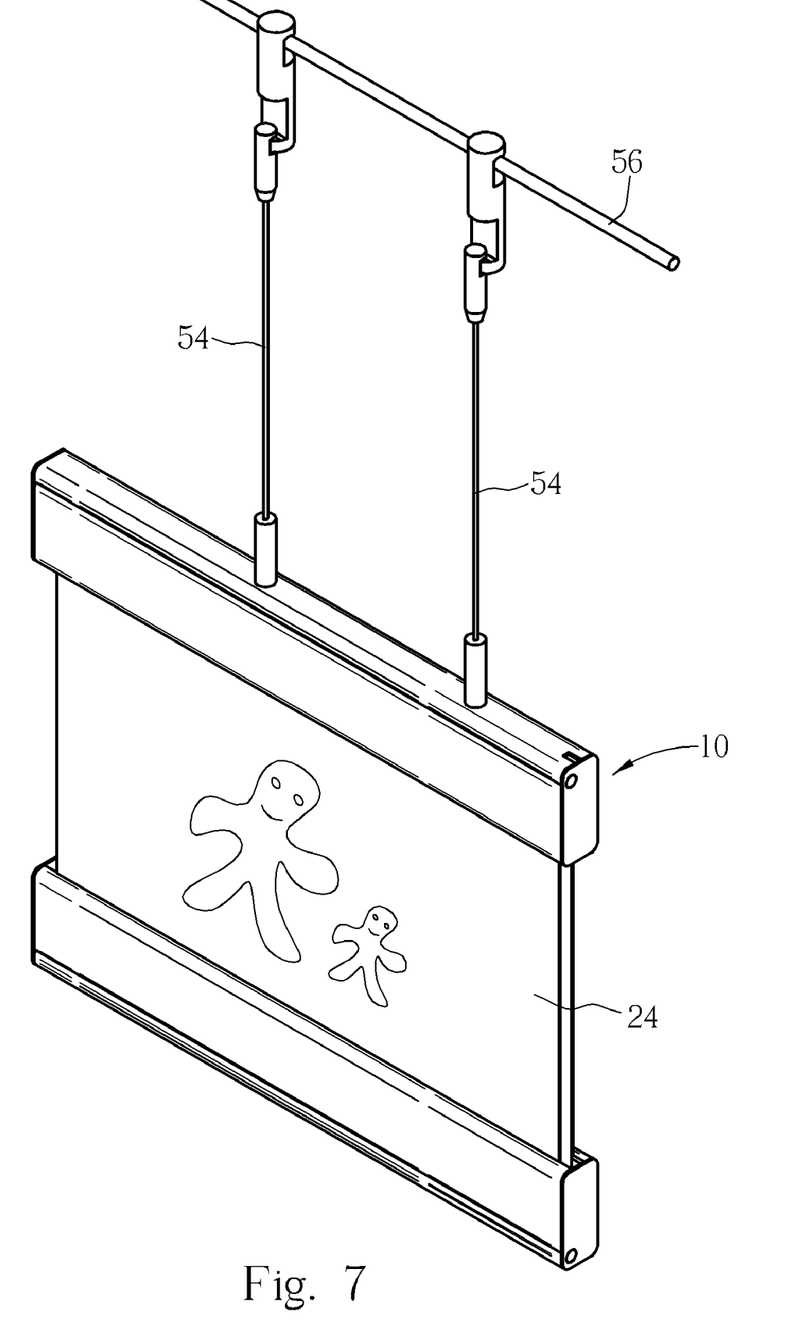
Figure 8:
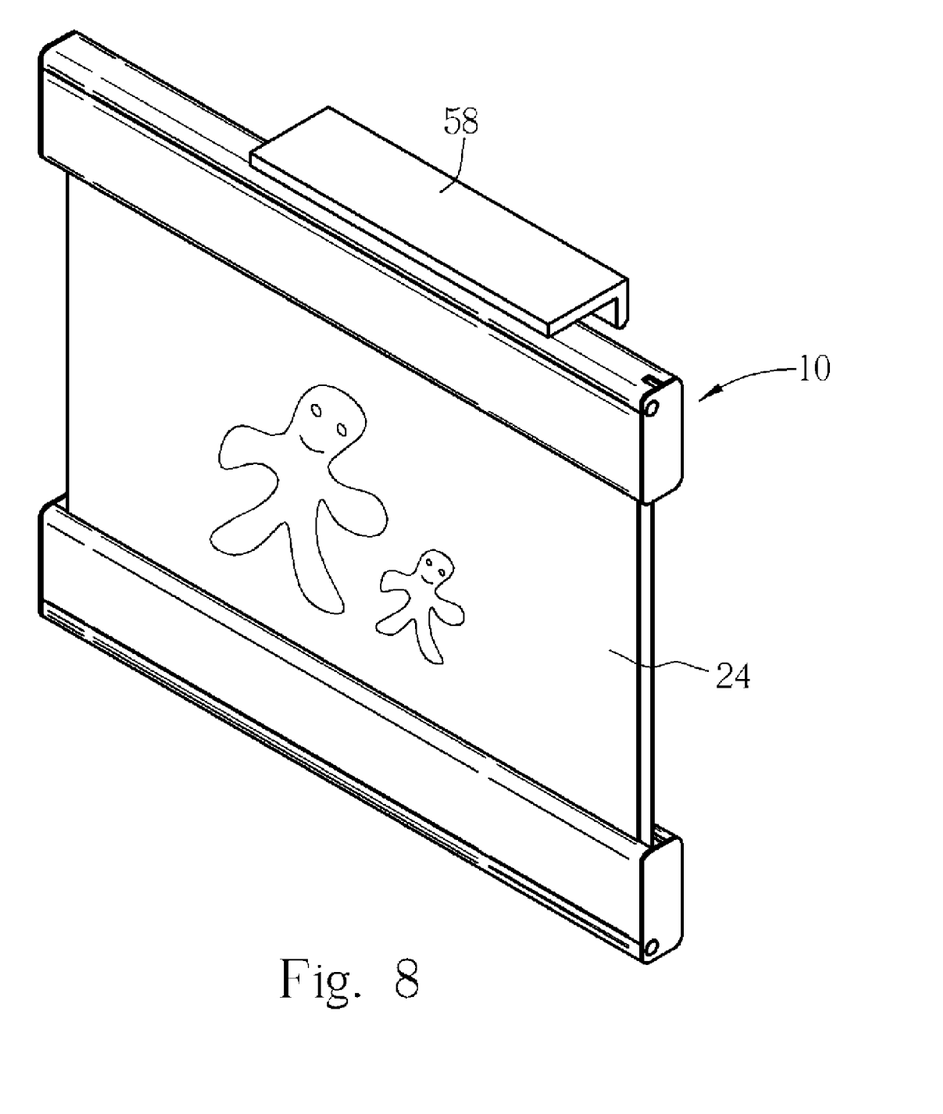
Figure 9:
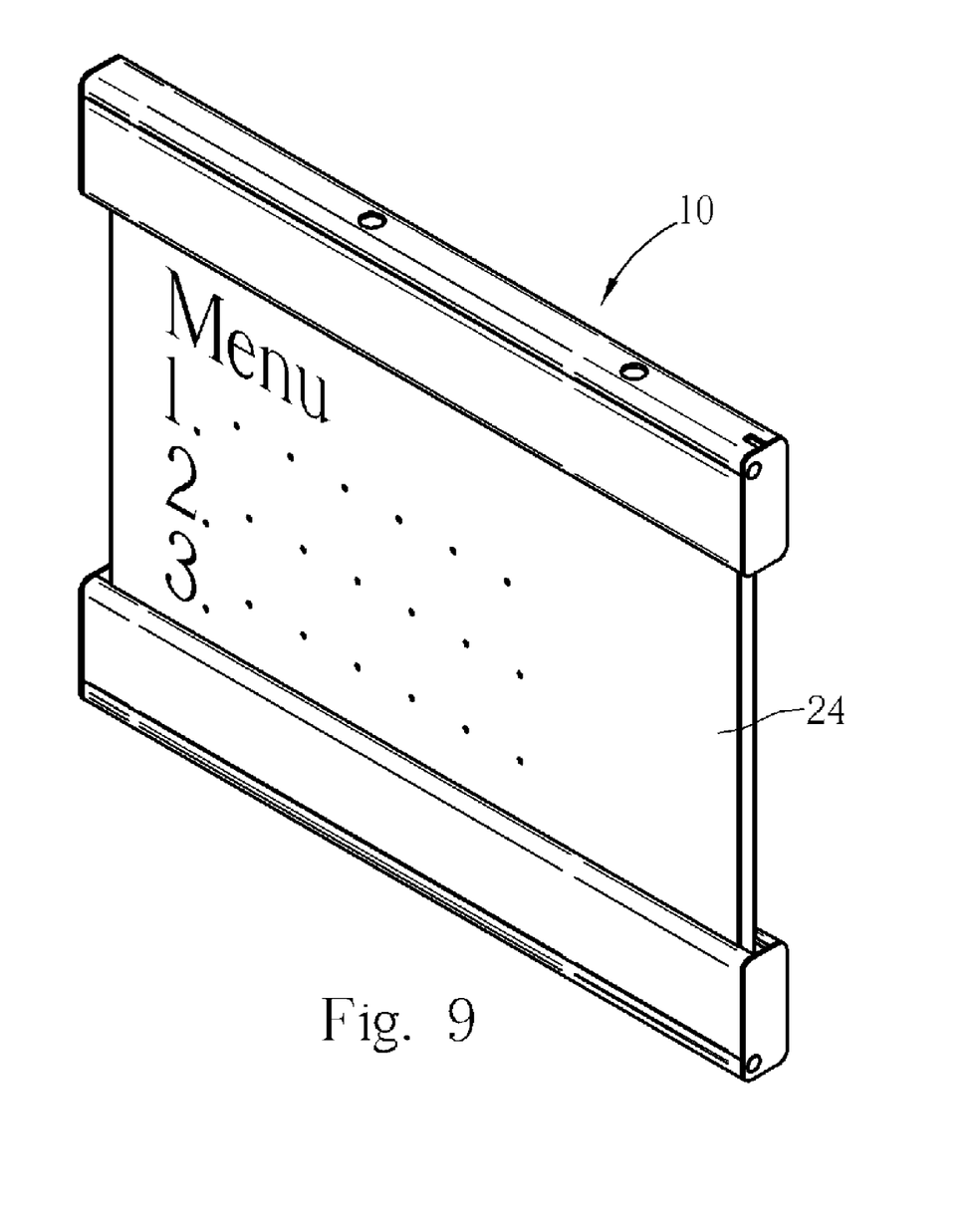

The size of the ultra-thin backlight display panel 10 is adjustable according to various customers' needs. Moreover, to fit various usage environments, the methods to set the ultra-thin backlight display panel 10 are different. For example, the ultra-thin backlight display panel 10 can be hung on a wall, suspended from a ceiling, or fixed at the ceiling. Moreover, both of the planes of the backlight module can be used to show specific information, or just a single plane of the backlight module is used. Please refer back to FIG. 1. The upper housing 12 has two openings 22 for connecting a fixture, which is used for placing the ultra-thin backlight display panel 10. Please refer to FIGS. 6–9, which show how to use the ultra-thin backlight display panel 10. As shown in FIG. 6, the ultra-thin backlight display panel 10 can be fixed at a ceiling with a horizontal board 50 and two vertical shafts 52. As shown in FIG. 7, the ultra-thin backlight display panel 10 is hung from the ceiling with a horizontal shaft 56 and two vertical ropes 54. As shown in FIG. 8, the ultra-thin backlight display panel 10 can be hung on the wall with a fixture 58. And as shown in FIG. 9, a user can write or draw on the ultra-thin backlight display panel 10.

The upper housing 12 and the lower housing 14 are electroplated, which makes the ultra-thin backlight display panel 10 have an elegant and succinct appearance. All the components of the ultra-thin backlight display panel 10 are made of fireproof material, so the ultra-thin backlight display panel 10 can be used as an emergency indicator.

In contrast to the prior art, the present invention ultra-thin backlight display panel not only has a smaller thickness, but also a smaller volume. Besides, the light-uniformity technique of the LCD is adapted for the design of the ultra-thin backlight display panel, so the same surface illumination can be provided with lower-energy consumption and the brightness can be more uniform.

What is claimed is:

1. An ultra-thin backlight display panel comprising:
    an upper housing having a first cold cathode fluorescent lamp (CCFL) for generating light and a first lampshade for collecting light generated by the first CCFL;
    a lower housing having a second CCFL for generating light and a second lampshade for collecting light generated by the second CCFL; and
    a backlight module having a light guide plate, a transparent film, and a reflection film, the light guide plate having four sides, wherein two of the four sides are connected with the upper housing and the lower housing, and the other two sides are respectively covered with a reflective material, the transparent film being positioned on a first plane of the light guide plate and the reflection film being positioned on a second plane of the light guide plate to reflect light from the first CCFL and the second CCFL;
    wherein the reflective materials covering the two sides of the light guide plate reflect light from the light guide plate back, and
    wherein the upper housing has an upper base and an upper cover installed on the upper base in a rotatable manner and the upper cover is capable of clipping the transparent film on the first plane of the light guide plate.

2. The ultra-thin backlight display panel of claim 1 wherein a thickness of the backlight module is about one centimeter.

3. The ultra-thin backlight display panel of claim 1 wherein the lower housing has a lower base and a lower cover installed on the lower base in a rotatable manner, and the lower cover is capable of clipping the transparent film on the first plane of the light guide plate.

4. The ultra-thin backlight display panel of claim 1 wherein the transparent film is capable of diffusing light.

5. The ultra-thin backlight display panel of claim 1 wherein the upper housing has at least one opening for connecting a fixture that is used for placing the ultra-thin backlight display panel.

* * * * *